(12) United States Patent
January et al.

(10) Patent No.: US 8,640,091 B2
(45) Date of Patent: Jan. 28, 2014

(54) METHOD OF OPERATING A DATA PROCESSING SYSTEM

(75) Inventors: Sian S. January, Winchester (GB); Helen L. Beeken, Eastleigh (GB); Andrew S. Clement, Fair Oak (GB); Matthew P. Chapman, Eastleigh (GB); Matthew A. Webster, Hook (GB)

(73) Assignee: International Business Machines Corporation, Armonk, NY (US)

( * ) Notice: Subject to any disclaimer, the term of this patent is extended or adjusted under 35 U.S.C. 154(b) by 1663 days.

(21) Appl. No.: 11/848,026

(22) Filed: Aug. 30, 2007

(65) Prior Publication Data

US 2008/0244513 A1    Oct. 2, 2008

(30) Foreign Application Priority Data

Mar. 26, 2007    (EP) .................................... 07104868

(51) Int. Cl.
*G06F 9/44*    (2006.01)
(52) U.S. Cl.
USPC ........................................ 717/113; 717/100
(58) Field of Classification Search
USPC ................................................ 717/100, 113
See application file for complete search history.

(56) References Cited

U.S. PATENT DOCUMENTS

2007/0185777 A1*    8/2007    Pyle et al. ...................... 705/26

OTHER PUBLICATIONS

Andy Clement et al., "Aspect-Oriented Programming with ADJT", 2003, ECOOP Workshop on Analysis of Aspect-Oriented Software, pp. 1-5.*
George Harley et al., "Aspect J in the Enterprise, Part 1: Introducing AspectJ to IBM Rational Application Developer 6.0", Jul. 26, 2005.*
Matt Chapman et al., "Develop aspect-oriented Java applications with Eclipse and AJDT", Sep. 21, 2004, pp. 1-13.*
Sandra Kay Miller, "Aspect-Oriented Programming Takes Aim at Software Complexity", Apr. 2001, Computer, vol. 34, Issue 4, pp. 18-21.*
IPCOM000140785D IBM TDB "Aspect Oriented Monitoring Agents".

* cited by examiner

*Primary Examiner* — Wei Zhen
*Assistant Examiner* — Lanny Ung
(74) *Attorney, Agent, or Firm* — Prentiss, Johnson, Edell, Shapiro & Finnan, LLC

(57) ABSTRACT

A method of operating a data processing system comprises running a source code editor, displaying source code in a graphical interface of the source code editor, and displaying a summary box, the summary box comprising a list of one or more aspects affecting the source code. The system is configured so that on receipt of a user input corresponding to an aspect listed in the summary box there is displayed one or more cross-reference markers of the selected aspect in the graphical interface of the source code editor.

16 Claims, 4 Drawing Sheets

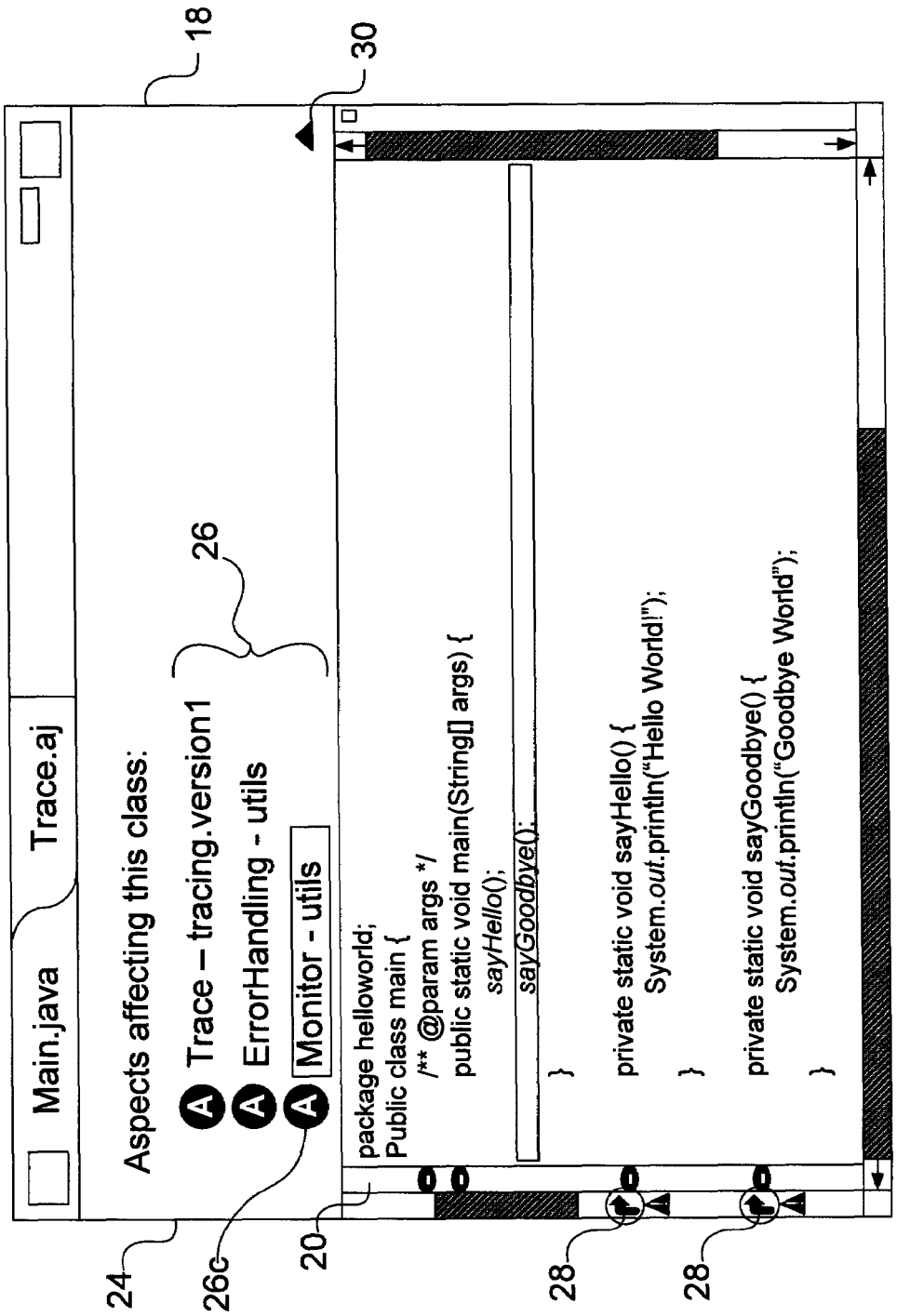

METHOD OF OPERATING A DATA PROCESSING SYSTEM

RELATED APPLICATION

This application claims the benefit of and priority to European Patent Application No. 07104868.0, filed Mar. 26, 2007, the contents of which are incorporated by reference herein in its entirety.

BACKGROUND

1. Field

This disclosure relates to a method of operating a data processing system. More particularly, the disclosure relates to a class-level overview of the crosscutting structure in an aspect-oriented system.

2. General Background

In the field of creating computer software, it is common to produce a large program with multiple developers where a number of features have been written using aspect-oriented techniques. An aspect is a self-contained piece of code that defines the circumstances in the main source code that will trigger the aspect. A person working on a file or set of files in such a program may like to know the set of aspects that are in effect on a given file (a portion of the main source code). In programming environments such as Eclipse (www.eclipse.org) and the AspectJ Development Tools (AJDT, see www.eclipse.org/ajdt), markers are added to the left hand margin of the editor for each place in the source code where an aspect matches (where advice of an aspect is in effect). However, in order to work out which aspects are affecting the source code, a user has to select each individual marker, right click, and follow a menu.

AJDT also provides a cross references view, but this view also shows the specific advice in effect rather than the aspects, so it can be time-consuming to work out which aspects are affecting the source code. The two methods are time consuming, especially when there are a large number of pieces of advice affecting the source code. In addition, the user may have switched off the markers and may not have the cross references view open to avoid cluttering the on-screen view of the source code editor.

SUMMARY

According to a first aspect of the present disclosure, there is provided a method of operating a data processing system comprising running a source code editor, displaying source code in a graphical interface of the source code editor, and displaying a summary box, the summary box comprising a list of one or more aspects affecting the source code.

According to a second aspect of the present disclosure, there is provided a data processing system comprising a user interface, a processor for running a source code editor and a graphical interface for displaying source code of the source code editor, the graphical interface arranged to display a summary box, the summary box comprising a list of one or more aspects affecting the source code.

According to a third aspect of the present disclosure, there is provided a computer program product on a computer readable medium for operating a data processing system, the computer program product comprising instructions for running a source code editor, displaying source code in a graphical interface of the source code editor, and displaying a summary box, the summary box comprising a list of one or more aspects affecting the source code.

DRAWINGS

The above-mentioned features of the present disclosure will become more apparent with reference to the following description taken in conjunction with the accompanying drawings wherein like reference numerals denote like elements and in which:

FIG. 4 is another screenshot of a graphical user interface in accordance with an aspect of the disclosure.

DETAILED DESCRIPTION

A summary box displayed within a source code editor is provided. The summary box includes a list of the aspects affecting the source code being displayed by a source code editor. In one aspect, the summary box is visible wherever the user scrolled in the source code file. The summary box is implemented as an extension to the source code editor. Further, the summary details are updated after a build. The summary box contains a list of all aspects that are affecting the current file or class in some way. This includes advice and any other available aspect-oriented constructs. In one embodiment, selecting an aspect in the summary box through a mouse click opens the source file for the aspect in another editor window. Alternatively, each aspect in the summary box may be presented as a hyperlink such that the name of the aspect looks like a hyperlink (for example, blue underlined text), and a single click navigates to the source file for the aspect. The hyperlink may, for example, be in Hypertext Markup Language ("HTML"). In Eclipse, this style fits well with the title/status box found in most dialogs and wizards in the platform.

If a source code file contains more than one component (for example in JAVA, more than one class), the component is made explicit in the summary box by displaying a component name linked to an aspect listed in the summary box such that the aspect affects the named component of the source code. For example, for class "Circle" with inner class "InnerClass", where aspects affect both the class and the inner class, the summary box would contain two sections, "Aspects affecting Circle: . . .", and below this, "Aspects affecting Circle.InnerClass: . . ."). Aspects can also affect other types as well as classes (including other aspects). The displayed source code in the graphical interface of the source code editor can be the source code of an aspect.

The system is further configured so that after receiving a user input (such as a right-click) corresponding to an aspect listed in the summary box there is displayed one or more cross-reference markers of the selected aspect in the graphical interface of the source code editor. The user is thereby able to select one of the listed aspects in the summary box and see the gutter markers for that specific aspect. Furthermore, the user can toggle on/off the advice cross-reference markers to see where the advice matches a method within the source code being viewed.

Figure 1:
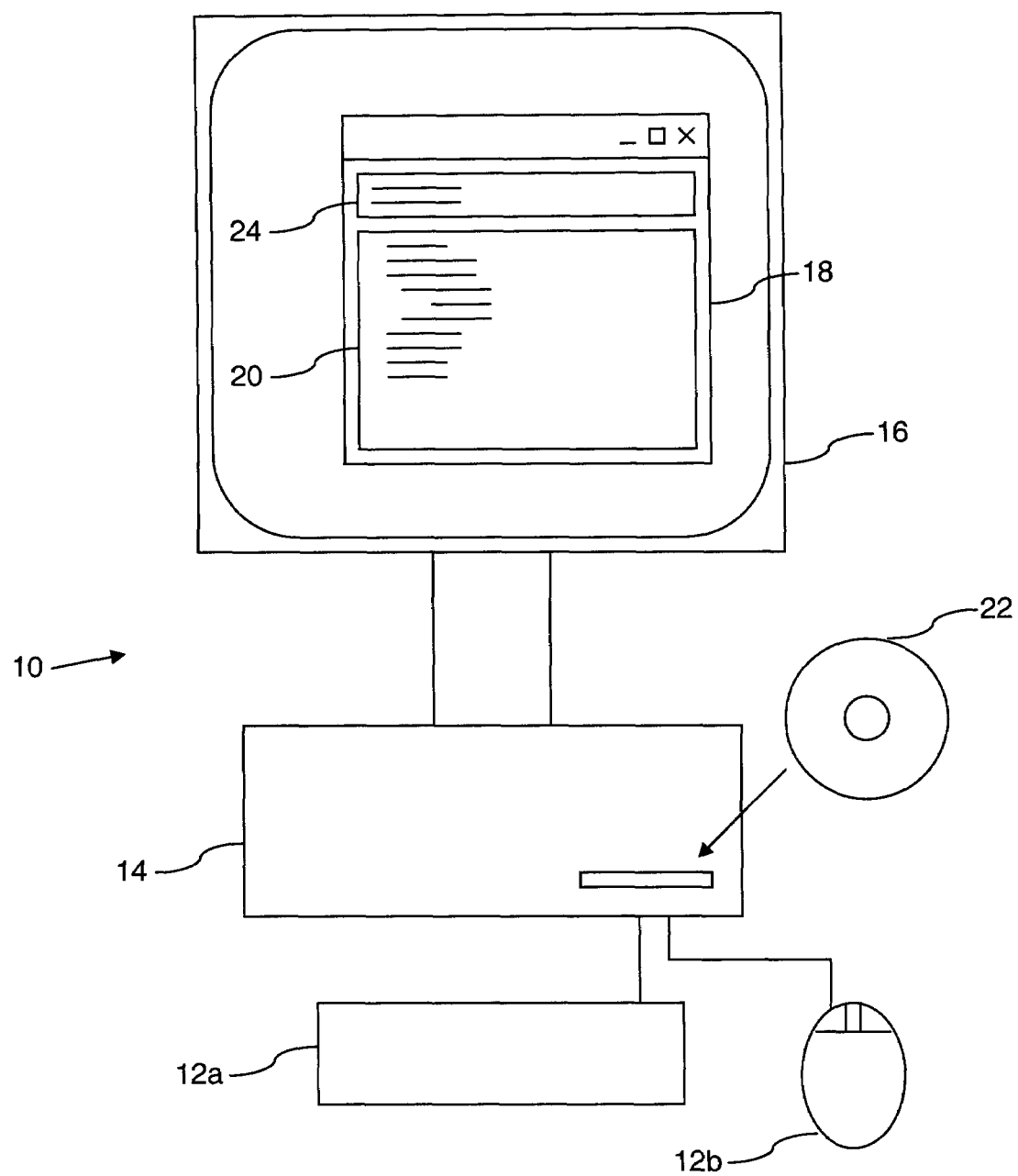
FIG. 1 is a schematic diagram of a data processing system in accordance with one aspect of the disclosure.

FIG. 1 shows a data processing system 10 comprising user interface devices 12, comprising a keyboard 12a and a mouse 12*b*, a processor 14 for running a source code editor and a graphical interface 16 for displaying source code of the source code editor. The processor 14 runs an integrated development environment 18 which includes the source code editor 20. A computer readable medium, such as a CD-ROM 22 carries a computer program product with instructions for operating the data processing system 10.

A user of the system 10 can enter new source code via the keyboard 12*a* while working on a project, which may be a new project or may be amendment to a previously existing project. The integrated development environment ("IDE") 18 is a tool for creating and/or amending source code of a computer program. The primary tool of the IDE 18 is the source code editor 20, but other functions such as error checking and project management are provided by the IDE 18.

The graphical interface 16 is arranged to display a summary box 24, the summary box 24 comprising a list of one or more aspects affecting the source code shown in the source code editor 20. The source code editor can show cross-reference markers indicating crosscutting in the source code. However, in complex projects with multiple aspects, this may lead to excessive screen clutter, as a very large number of cross-reference markers will be shown on the display. Instead, the summary box 24 lists those aspects that are crosscutting to the source code shown by the editor 20.

In some types of computer programming, crosscutting is a feature of the structure of the programming language/grammar being used. For example, in aspect oriented programming, in addition to the conventional source code of multiple objects, source code for one or more aspects is provided. For example, AspectJ is an aspect oriented extension of JAVA. An aspect is not called by another part of a program in a conventional sense, but defines itself when it will operate. Each aspect will define criteria under which the aspect executes. When these criteria apply (or match) within the running of the program, then the aspect will operate. For each aspect, there will be multiple positions within the body of the source code when the aspect could or would be matched. To avoid cluttering the screen, only the names of the aspects that have one or more pieces of advice matching the source code in the editor 20, are shown.

Figure 2:
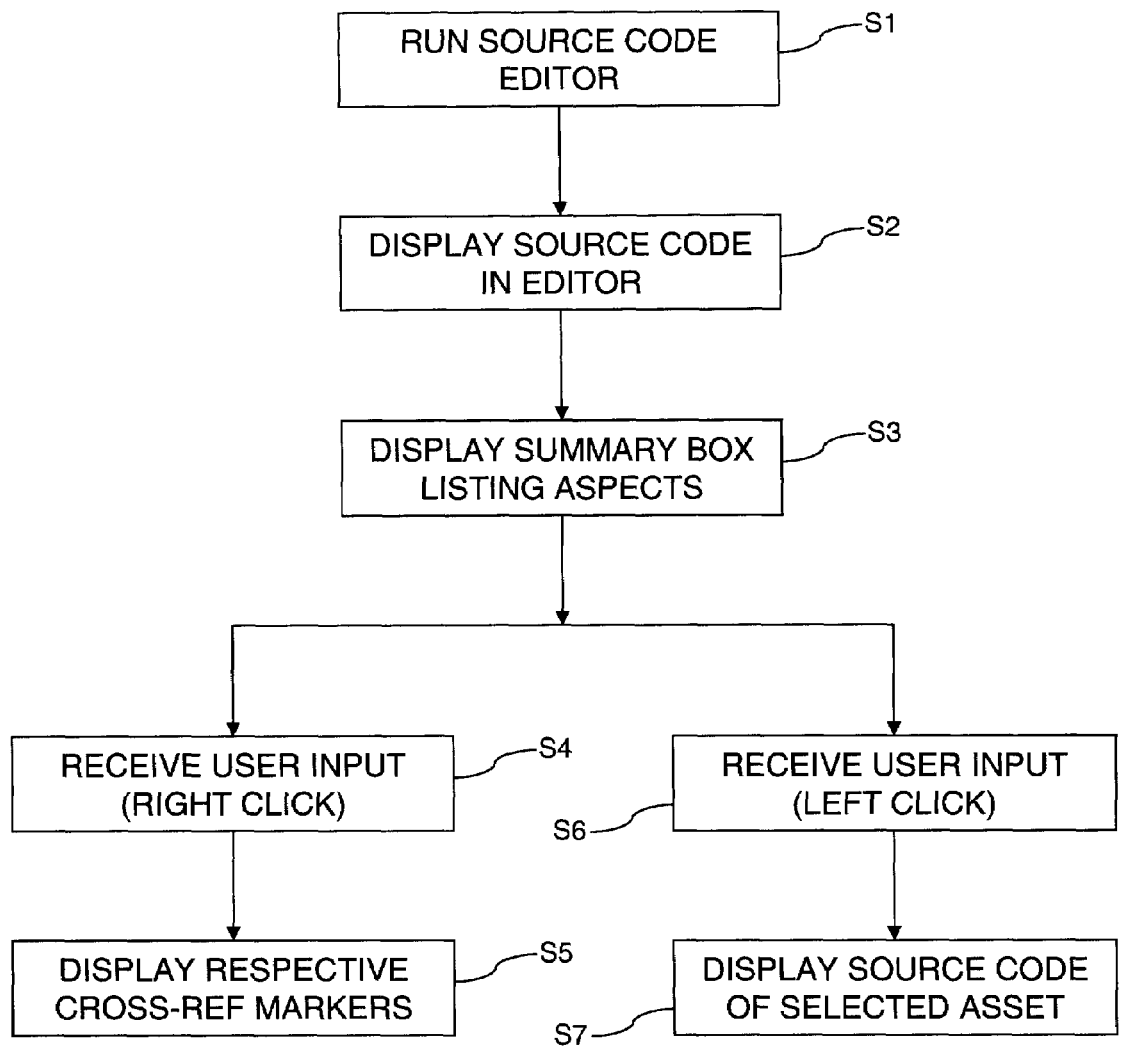
FIG. 2 is a flowchart of a method of operating the data processing system in accordance with one aspect of the present disclosure.

A method of operating a data processing system in accordance with one aspect of the present disclosure is summarized in FIG. 2. The source code editor 20 is initially run as indicated by step S1. Source code is displayed in a graphical interface of the source code editor 20, as indicated at step S2. In addition to the displaying of the source code, the data processing system 10, at step S3, displays the summary box 24, which comprises a list of one or more aspects affecting the source code currently being worked on (not necessarily all of this source code is actually visible). Instead of the text of the source code being marked at each place, in the gutter, with a cross-reference marker each time an advice matches a method, a simple list of aspects is provided in the summary box 24. The aspects listed in the summary box 24 are those that have pieces of advice that match one or more methods in the source code displayed.

The user can manipulate the display of the data relating to the aspects shown in the summary box 24. The operating method can further comprise, at step S4, receiving a first user input (such as right-click with the mouse 12*b*) corresponding to an aspect listed in the summary box 24 and, at step S5, displaying one or more cross-reference markers of the selected aspect in the graphical interface of the source code editor 20. In this way, a user can select one of the listed aspects shown in the summary box 24, and the cross-reference markers for that selected aspect will be shown to the user. The user can turn on and off all of the aspects in the same way. Alternative ways to implement the enabling and disabling of advice markers can be by some interaction with the summary box 24, such as via an associated checkbox, or via a context menu (i.e. right-click then a menu pops up and a user selects "Show Advice Markers" or "Hide Advice Markers"), and not a single right-click.

An additional method of manipulating the display of the data is shown at steps S6 and S7. The method can further comprise, at step S6, receiving a second user input (such as left-click with the mouse 12*b*) corresponding to an aspect listed in the summary box 24 and, at step S7 displaying source code of the selected aspect in the graphical interface of the source code editor 20. This gives the user an easy way of accessing the source code of an aspect listed in the summary box 24.

The configuration of the data processing system 10 is such that it supports receiving a third user input (such as a click on an appropriate screen icon) the system 10 will accordingly minimize the displayed summary box 24. If more than one type is displayed in the source code editor 20, such as multiple classes if JAVA is the language being used, then the summary box 24 will display a component name that is linked to an aspect listed in the summary box 24, said aspect affecting the named component of the source code. So if the file in the source code window has three components within it, then each aspect listed in the summery box 24 will have additional information with it, that details which of the three components the aspect has an advice that matches a method within the component. The source code that is displayed in the graphical interface of the source code editor 20 could itself be the source code of an aspect.

Figure 3:
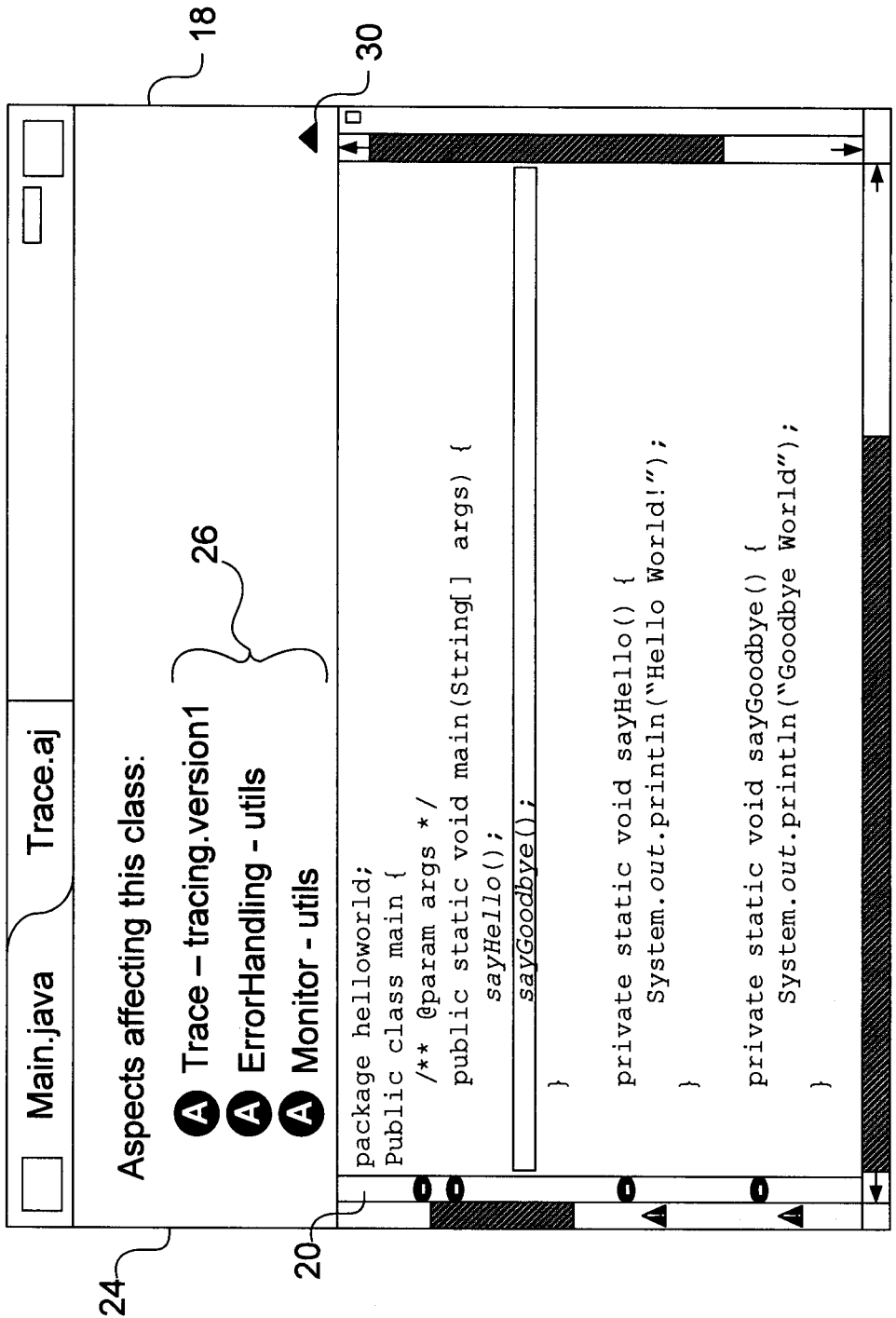
FIG. 3 is a screenshot of a graphical user interface in accordance with an aspect of the disclosure.

FIG. 3 shows a screenshot of the integrated development environment 18. This image shows an example of what the summary box 24 might look like, in a practical embodiment. The source code editor 20 shows the source code of the current file that is being worked on, and the summary box 24 lists three aspects 26 that relate to the source code in the editor 20. These aspects 26 relate to the current portion of source code being worked on, some of which may be off-screen and only visible when scrolling takes place.

The configuration of the data processing system 10 and the source code editor 20, is such that it supports receiving a third user input, such as a click on an appropriate screen icon 30, and the system 10 will accordingly minimize the displayed summary box 24.

Each aspect 26 has one or more pieces of advice that match one or more methods within the source code displayed. Rather than cluttering the gutter with a large number of cross-reference markers, only the summary information is shown in the box 24. As discussed above, more information can be obtained by the user by clicking on an aspect 26 shown in the summary box 24.

For example, as shown in FIG. 4, if the user right-clicks on the aspect 26*c* "Monitor—utils", then the cross-reference markers 28 for that aspect 26*c* will be displayed by the source code editor 20. These cross-reference markers 28 show where this specific aspect 26*c* has advices that match specific methods within the source code displayed by the editor 20. The data processing system may also be configured so that tooltip hovers are provide for each of the aspects 26 in the summary box 24, which could contain, for example, the Javadoc for the respective aspect 26 or some other useful information.

Users who are not interested in the specifics of how aspects affect a file can switch off the advice markers. This makes it easier to see other markers in the file such as errors, warnings, search results, breakpoints, highlight matching and task tags, which can make the user more efficient in their work. They can also close the cross references view, which increases the screen area available to other views and can also help with efficiency in the user's work. Preferably, the summary box is capable of being minimized, to further reduce the clutter on the screen.

A developer who is not working on any of the features written using aspect-oriented programming does not need to know in detail about what effects aspects have in order to complete their own work. Having a large number of advice markers in the editor window may become confusing or distracting and may cause the developer to become unnecessarily worried about features not directly related to their own. On the other hand, the developer may need a way to understand which other features are going to interact with their code, for example, when there is a problem relating to a particular file and the user wants to rule out aspects. Using the system described by this disclosure, if the developer wants to find out whether a particular aspect affects a particular class, they can do so very quickly without compromising their own development experience.

This disclosure also helps those developers who are aware of aspects and may even be writing an aspect, but would like to turn off the markers for all other aspects which aren't theirs, to make it easier to see what their own aspect is doing. These developers may also want to be aware of which other aspects are affecting a class and would be able to use the summary box to find that out.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
running a source code editor;
displaying source code within the source code editor;
displaying a summary box, the summary box comprising a list of only one or more aspects affecting the source code displayed within the source code editor;
receiving a user input that selects a name of an aspect from the list of one or more aspects to select a selected aspect, the one or more aspects including advice corresponding to the source code displayed within the source code editor, the advice having a name associated therewith that differs from the name of the aspect; and
displaying one or more cross-reference markers of the selected aspect in the graphical interface of the source code editor without displaying any cross-reference markers for any of the remaining aspects in the list of one or more aspects.

2. The method of claim 1 further comprising displaying source code of the selected aspect in the graphical interface of the source code editor.

3. The method of claim 1 further comprising receiving a user input and minimizing the summary box in response to the user input.

4. The method of claim 1 further comprising displaying a component name in the summary box, the component being linked to the one or more aspects.

5. The method of claim 1 wherein the one or more aspects are displayed as a hyperlink, the hyperlink comprising a link to the location of the source file corresponding to the one or more aspects.

6. The method of claim 1 wherein the source code displayed in the source code editor comprises source code of an aspect.

7. A system comprising:
a user interface;
a processor for running a source code editor; and
a graphical interface for displaying source code in the source code editor, the graphical interface further configured to display a summary box, the summary box comprising a list of only one or more aspects affecting the source code displayed in the graphical interface, the graphical user interface further configured to receive a user input that selects a name of an aspect from the list of one or more aspects to select a selected aspect, the graphical user interface further configured to display one or more cross-reference markers of the selected aspect in the graphical interface of the source code editor without displaying any cross-reference markers for any of the remaining aspects in the list of one or more aspects, the one or more aspects including advice corresponding to the source code displayed within the source code editor, the advice having a name associated therewith that differs from the name of the aspect.

8. The system of claim 7 wherein the user interface is further configured to display source code corresponding to the selected aspect.

9. The system of claim 7 wherein the user interface is configured to receive a user input and the graphical interface is configured to minimize the summary box in response to the user input.

10. The system of claim 7 wherein the graphical interface is further configured to display a component name linked to the one or more aspects listed in the summary box.

11. The system of claim 7 wherein the source code displayed in the graphical interface of the source code editor is the source code of an aspect.

12. A computer program product comprising a non-transitory computer useable medium having a computer readable program, wherein the computer readable program when executed on a computer causes the computer to:
run a source code editor;
display source code in a graphical interface of the source code editor; and
display a summary box within the source code editor, the summary box comprising a list of only one or more aspects affecting the source code;
receive a user input that selects a name of an aspect from the list of one or more aspects to select a selected aspect, the one or more aspects including advice corresponding to the source code displayed within the source code editor, the advice having a name associated therewith that differs from the name of the aspect; and
display one or more cross-reference markers of the selected aspect in the graphical interface of the source code editor without displaying any cross-reference markers for any of the remaining aspects in the list of one or more aspects.

13. The computer program product of claim 12 wherein the computer readable program when executed on a computer further causes the computer to display in the graphical interface source code corresponding to the selected aspect.

14. The computer program product of claim 12 wherein the computer readable program when executed on a computer further causes the computer to receive a user input and to minimize the summary box in response to the user input.

15. The computer program product of claim 12 wherein the summary box further comprises a component name linked to the one or more aspects listed in the summary box.

16. The computer program product of claim 12 wherein the source code displayed in the graphical interface of the source code editor is the source code of an aspect.

\* \* \* \* \*